US012033453B2

(12) United States Patent
Yoshida

(10) Patent No.: US 12,033,453 B2
(45) Date of Patent: Jul. 9, 2024

(54) COIN HANDLING APPARATUS

(71) Applicant: Glory Ltd., Himeji (JP)

(72) Inventor: Yusuke Yoshida, Himeji (JP)

(73) Assignee: GLORY LTD., Himeji (JP)

( * ) Notice: Subject to any disclaimer, the term of this patent is extended or adjusted under 35 U.S.C. 154(b) by 519 days.

(21) Appl. No.: 16/826,313

(22) Filed: Mar. 23, 2020

(65) Prior Publication Data

US 2020/0312076 A1 Oct. 1, 2020

(30) Foreign Application Priority Data

Mar. 27, 2019 (JP) ................................ 2019-060399

(51) Int. Cl.
*G07D 3/14* (2006.01)
*G07D 3/16* (2006.01)
(Continued)

(52) U.S. Cl.
CPC ................ *G07D 9/00* (2013.01); *G07D 3/14* (2013.01); *G07D 11/10* (2019.01); *G07D 2201/00* (2013.01)

(58) Field of Classification Search
CPC ...... G07D 9/00; G07D 11/10; G07D 2201/00; G07D 3/16; G07D 3/14; G07D 3/12; G07D 3/121; G07D 3/123; G07D 3/125; G07D 1/00; G07D 1/02; G07D 1/04; G07D 1/06; G07D 1/08; G07D 3/00; G07D 3/02; G07D 3/04; G07D 3/06; G07D 3/08; G07D 3/10; G07D 3/126; G07D 3/128; G07D 9/008; G07D 13/00
See application file for complete search history.

(56) References Cited

U.S. PATENT DOCUMENTS 4,615,350 A 10/1986 Boudville
4,782,937 A * 11/1988 Chen ........................ G07F 9/04 194/346

(Continued)

FOREIGN PATENT DOCUMENTS

EP 1 808 822 A1 7/2007
EP 1 927 955 A1 6/2008

(Continued)

OTHER PUBLICATIONS

English Translation of H07093632A JP, 07-093632, A (1995) published Apr. 7, 1995. (Year: 1996).*

(Continued)

*Primary Examiner* — Jeffrey A Shapiro
(74) *Attorney, Agent, or Firm* — XSENSUS LLP

(57) ABSTRACT

In order to drop a coin into an opening formed in a transport path for sorting coins, a coin handling apparatus includes: a transport path having a transport surface in which the opening for dropping a coin is formed; a conveyor configured to transport a coin on the transport surface along the transport path; a gate including a plurality of members configured to move between a closed position for closing the opening such that a coin transported by the conveyor is not dropped into the opening, and an opened position for opening the opening such that the coin is dropped into the opening; and a drive motor configured to drive the plurality of members to control the gate to move between the closed position and the opened position.

19 Claims, 11 Drawing Sheets

(51) Int. Cl.
*G07D 9/00* (2006.01)
*G07D 11/10* (2019.01)

(56) References Cited

U.S. PATENT DOCUMENTS

| | | | | | |
|---|---|---|---|---|---|
| 5,485,906 | A * | 1/1996 | Newton | G07F 1/044 194/346 |
| 7,614,544 | B2 * | 11/2009 | Trenner | G07F 9/04 232/15 |
| 2007/0087675 | A1 | 4/2007 | Umeda et al. | |
| 2007/0144864 | A1 * | 6/2007 | Harada | G07D 3/14 194/346 |
| 2008/0060906 | A1 * | 3/2008 | Fitzgerald | G07D 11/50 194/207 |
| 2014/0332350 | A1 * | 11/2014 | Umeda | B65G 15/58 198/688.1 |
| 2015/0011145 | A1 * | 1/2015 | Suetomi | G07D 9/00 453/4 |
| 2018/0342124 | A1 * | 11/2018 | Takeuchi | G07D 3/02 |
| 2018/0342125 | A1 * | 11/2018 | Fujio | G07D 3/125 |

FOREIGN PATENT DOCUMENTS

| | | | |
|---|---|---|---|
| JP | 7-93632 | A | 4/1995 |
| JP | 8-9814 | Y2 | 3/1996 |
| JP | 2011-039593 | A | 2/2011 |
| JP | 2013-122744 | A | 6/2013 |

OTHER PUBLICATIONS

Australian Examination Report dated Aug. 28, 2020 in Australian Application No. 2020202120.

Extended European Search Report dated Aug. 14, 2020 in European Patent Application No. 20165158.5, 7 pages.

* cited by examiner

COIN HANDLING APPARATUS

CROSS REFERENCE TO RELATED APPLICATIONS

This application is entitled to the benefit of Japanese Patent Application No. 2019-060399, filed on Mar. 27, 2019, the disclosure of which including the specification, drawings and abstract is incorporated herein by reference in its entirety.

BACKGROUND

Field

The present disclosure relates to a coin handling apparatus that handles coins.

Description of the Background Art

Conventionally, coin handling apparatuses that perform depositing and dispensing of coins have been used. Japanese Laid-Open Patent Publication No. 2013-122744 discloses a coin handling apparatus that stores coins in a plurality of storage units for each denomination. The apparatus sorts coins by using a transport path on which coins are transported. A plurality of inlets are provided in the transport path so as to correspond to the plurality of storage units. A gate is disposed at each inlet. Coins transported on the transport path can pass over the closed gate. When the gate is opened, coins are dropped into the storage unit from the inlet. By opening the gates corresponding to the denominations of coins, the coins are stored in the storage units for each denomination.

SUMMARY

The present disclosure is directed to a coin handling apparatus including: a transport path having a transport surface in which the opening for dropping a coin is formed; a conveyor configured to transport a coin on the transport surface along the transport path; a gate including a plurality of members configured to move between a closed position for closing the opening such that a coin transported by the conveyor is not dropped into the opening, and an opened position for opening the opening such that the coin is dropped into the opening; and a drive motor configured to drive the plurality of members to control the gate to move between the closed position and the opened position.

DESCRIPTION OF THE PREFERRED EMBODIMENTS

In the conventional art described above, coins cannot be correctly sorted in some cases. For example, there is a possibility that the gates cannot be opened and closed in time when a transport speed of coins is high. By changing the shape of each gate into a shape for closing only a part of the opening of the inlet to reduce the weight of the gate, the opening/closing speed of the gate can be increased. In this case, however, even in a state where the gate is closed, a small-diameter coin may be dropped through a gap in the gate into the opening.

The present disclosure has been made in view of problems in the conventional art, and an object of the present invention is to provide a coin handling apparatus that can drop a coin to be dropped, into an opening formed in a transport path.

A coin handling apparatus according to one aspect of the present disclosure includes: a transport path having a transport surface in which an opening for dropping a coin is formed; a conveyor configured to transport a coin on the transport surface along the transport path; a gate configured to move between a closed position for closing the opening such that a coin transported by the conveyor is not dropped into the opening, and an opened position for opening the opening such that the coin is dropped into the opening; and a drive motor configured to drive the plurality of members to control the gate to move between the closed position and the opened position.

The above and other objects, features, advantages and technical and industrial significance of this disclosure will be better understood by reading the following detailed description of presently preferred embodiments of the disclosure, when considered in connection with the accompanying drawings.

Figure 1A:
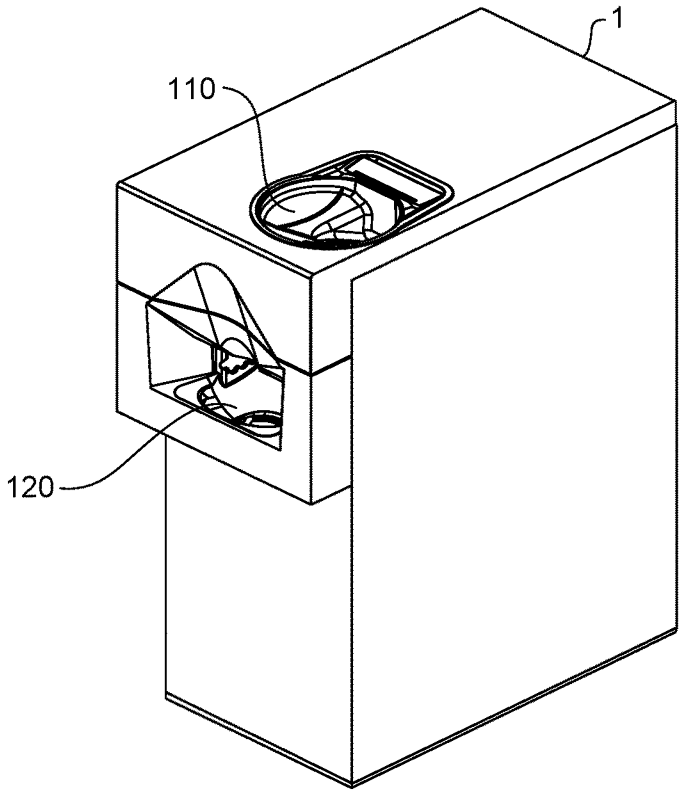
FIGS. 1A and 1B illustrate a coin handling apparatus according to an embodiment.
Figure 1B:
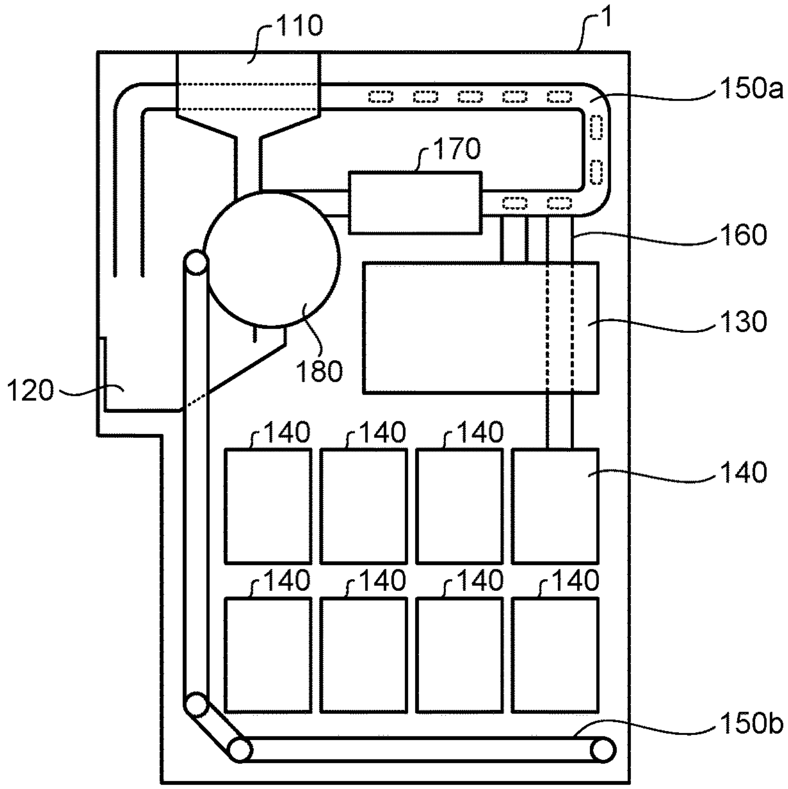

Hereinafter, an embodiment of the coin handling apparatus according to the present disclosure will be described with reference to the accompanying drawings. FIGS. 1A and 1B illustrate a coin handling apparatus 1 according to the present embodiment. FIG. 1A is an external view of the coin handling apparatus 1. FIG. 1B is a schematic diagram illustrating the internal structure of the coin handling apparatus 1.

As shown in FIG. 1A, the coin handling apparatus 1 includes a depositing unit 110 for depositing coins, and a dispensing unit 120 for dispensing coins. The depositing unit 110 is formed on an upper surface of the coin handling apparatus 1. The dispensing unit 120 is formed on a front surface of the coin handling apparatus 1. In addition to the depositing unit 110 and the dispensing unit 120, the coin handling apparatus 1 includes a cassette 130, storage units 140, a transport unit 150 (150*a*, 150*b*), a recognition unit 170, and a feeding unit 180 as shown in FIG. 1B.

When depositing coins to the coin handling apparatus 1, the depositing unit 110 receives the coins. The coins received by the depositing unit 110 are dropped into the feeding unit 180. The feeding unit 180 stores the dropped coins and feeds out the stored coins one by one to a transport path constituting the transport unit 150*a*. The transport unit 150*a* transports the coins fed out by the feeding unit 180, along the transport path. The recognition unit 170 recognizes and counts the coins transported on the transport path. For example, the recognition unit 170 recognizes denominations, authenticity, and fitness of the coins. The recognition unit 170 counts the number and the monetary amount of the coins for each denomination, and counts the total number and the total monetary amount of the coins. A destination to store each coin is determined on the basis of the result of recognition by the recognition unit 170.

A plurality of chutes 160 are connected to the transport path. The chutes 160 are disposed on the transport path downstream of the recognition unit 170 in a transport direction. Each chute 160 connects the transport path to any one of the cassette 130 and the storage units 140. FIG. 1B shows some chutes to avoid complexity. An opening of each chute 160 that is formed in the transport path is normally closed by a gate. Coins being transported on the transport path passes over the closed gate. When the gate at the chute 160 corresponding to the destination to store a coin is opened, the coin is dropped into the chute 160 through the opening in the transport path. The dropped coin is stored in the cassette 130 or the storage unit 140 through the chute 160. For example, coins to be collected from the coin handling apparatus 1 are stored in the cassette 130, and coins to be deposited in the coin handling apparatus 1 are stored in the storage units 140 for each denomination. The gate will be described later.

When dispensing coins from the coin handling apparatus 1, the storage units 140 feed out coins to be dispensed, one by one. A transport path constituting the transport unit 150*b* is disposed below the storage units 140. The coins fed out from the storage units 140 are dropped onto the transport path of the transport unit 150*b*. The transport path is provided so as to receive coins fed out from all the storage units 140 and transport the received coins to the feeding unit 180.

The transport unit 150*b* transports coins received on the transport path below the storage units 140, toward the front side (the left side in FIG. 1B) of the apparatus, and then transports the coins upward. The coins transported upward are dropped into the feeding unit 180. By opening a gate at a bottom surface of the feeding unit 180, the coins dropped into the feeding unit 180 are dispensed from the dispensing unit 120. The coins discharged to the dispensing unit 120 can be taken out through an opening in the front surface of the coin handling apparatus 1.

The cassette 130 is detachably mounted to the coin handling apparatus 1. The cassette 130 stores coins dropped from the chutes 160 and feeds out the stored coins. Coins fed out from the cassette 130 are dropped onto the transport path of the transport unit 150*b*, similar to coins fed out from the storage units 140. For example, the cassette 130 is used for collection of and replenishing with coins.

Figure 2:
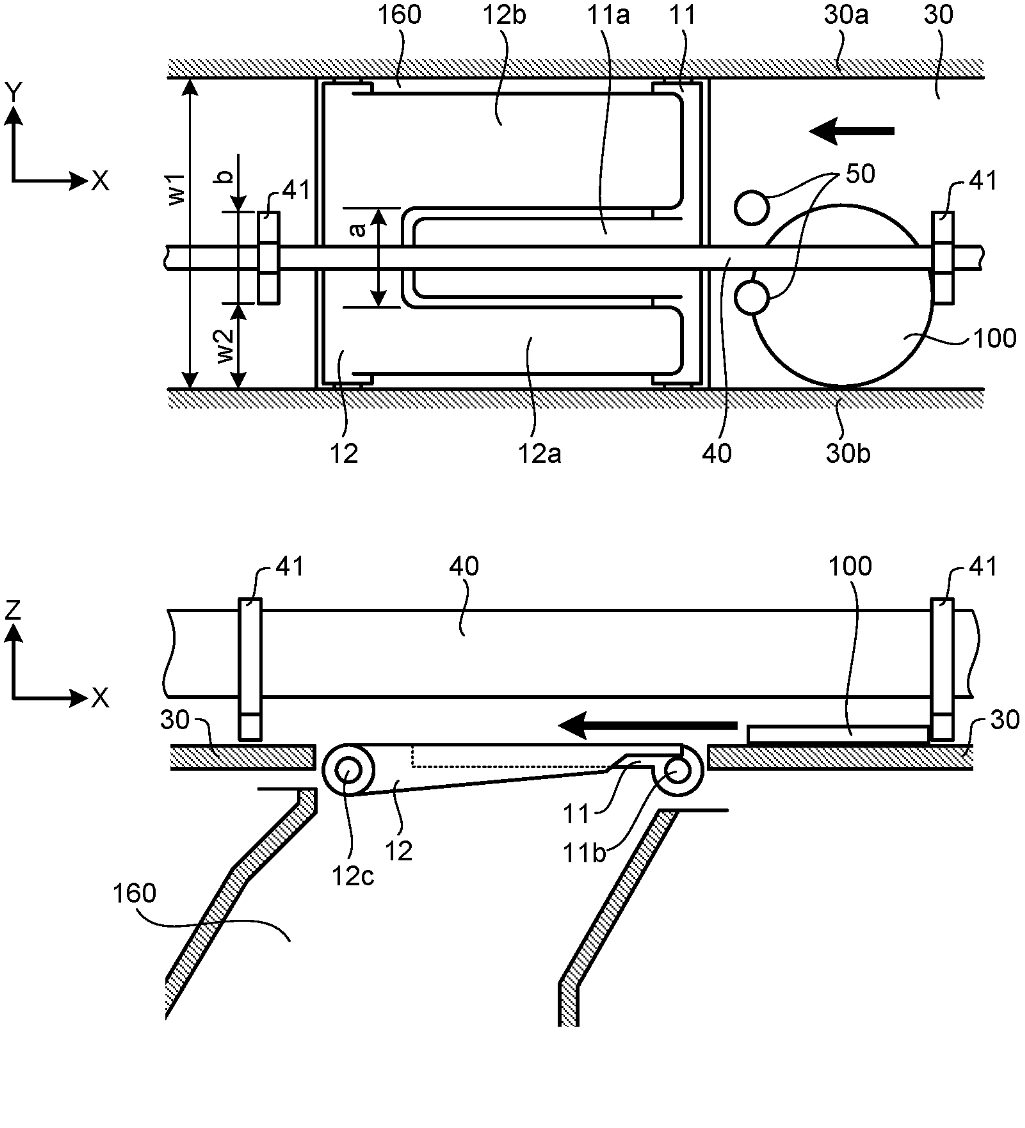
FIG. 2 shows schematic diagrams illustrating a state where a gate is closed.
Figure 3:
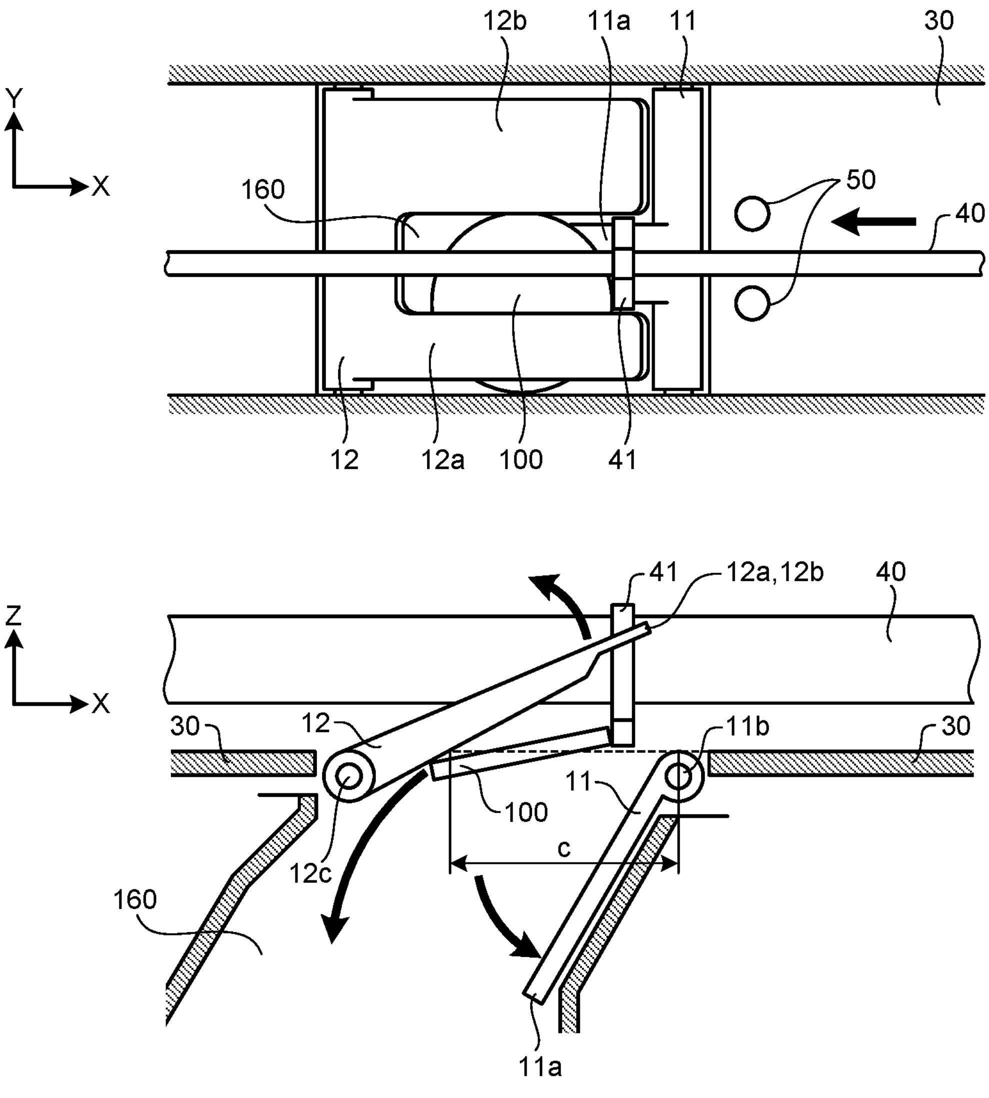
FIG. 3 shows schematic diagrams illustrating a state where the gate is opened.

Next, the gate will be described. FIG. 2 shows schematic diagrams illustrating a state where the gate is closed. FIG. 3 shows schematic diagrams illustrating a state where the gate is opened. The upper diagrams of FIG. 2 and FIG. 3 each show a view of a transport surface of a transport path 30 as viewed from a Z-axis positive direction side with a direction perpendicular to the transport surface being defined as a Z axis. The lower diagrams of FIG. 2 and FIG. 3 each show the transport path 30 as viewed from a Y-axis negative direction side when the width direction of the transport path 30 being defined as a Y axis. In FIG. 2 and the subsequent figures, the coordinate axes are shown such that the correspondence between each figure can be understood.

As shown by an arrow in FIG. 2, a coin 100 is transported on the transport path 30 in an X-axis negative direction (transport direction). The coin 100 is transported in a state where the coin surfaces is parallel to the transport surface of the transport path 30. A transport belt 40 is disposed along the transport path 30, above the transport path 30 (in the Z-axis positive direction). A plurality of transport pins 41 are mounted on the transport belt 40 at equal intervals. By the transport unit 150*a* driving the transport belt 40 in the transport direction, the transport pins 41 move in the transport direction. The moving transport pin 41 pushes the coin 100 from the rear side (from the upstream side in the transport direction), whereby the coin 100 is transported in the transport direction.

Openings connected to the chutes 160 are formed in the transport surface of the transport path 30. Each opening has a rectangular shape. A gate for closing and opening the opening is disposed at each opening. The gate includes a first member 11 disposed upstream in the transport direction, and a second member 12 disposed downstream in the transport direction.

When the gate is in a closed position where the gate is closed as shown in FIG. 2, the upper surface of the first member 11 and the upper surface of the second member 12 form a flat surface that is substantially flush with the transport surface of the transport path 30. That is, the first member 11 and the second member 12 form a part of the transport surface on which coins are transported. The coin 100 pushed by the transport pin 41 passes over the upper surfaces of the first member 11 and the second member 12 in the closed position and is transported further downstream along the transport path 30.

Side walls 30*a* and 30*b* are disposed at both sides in the width direction (Y axis direction) of the transport path 30, respectively. Movement of coins in the transport path width direction is restricted by the side wall 30*a* and the side wall 30*b*. The dimension and the positional relationship of each component are set such that all coins of a plurality of denominations having different diameters can be transported along the transport path 30 between the side wall 30*a* and the side wall 30*b*.

For example, in the case where the transport path 30 is provided so as to be inclined such that the side wall 30*a* side is higher in the vertical direction than the side wall 30*b* side, the coin 100 is transported in a state where the coin 100 is shifted to the side wall 30*b*. When the diameter of a coin having a maximum diameter is denoted by D and the diameter of a coin having a minimum diameter is denoted by d among coins transported on the transport path, the width w1 of the transport path 30 shown in FIG. 2 is set to a value larger than the maximum coin diameter D (w1>D). The distance w2 between the transport pin 41 and the side wall 30*b* is set to a value smaller than the minimum coin diameter d (w2<d).

On the transport path 30, a sensor 50 for detecting the coin 100 is disposed upstream of the opening of the chute 160 in the transport direction. The coin handling apparatus 1 uses the sensor 50 to detect the coming of the coin 100 to be dropped. In accordance with the coming of the coin 100 to be stored in the cassette 130 or the storage unit 140, the coin handling apparatus 1 rotates the first member 11 and the second member 12 from the closed position shown in FIG. 2 to an opened position shown in FIG. 3 to open the gate. When the gate is opened, the coin 100 is dropped into the chute 160 through the opening as shown in FIG. 3. The dropped coin 100 is stored in the cassette 130 or the storage unit 140. After the coin 100 is dropped, the coin handling apparatus 1 closes the gate again.

The second member 12 includes two claws 12*a* and 12*b*. As shown in FIG. 2, the gap a between the claw 12*a* and the claw 12*b* is wider than the length b in the transport path width direction of the transport pin 41 (a>b). The first member 11 includes a claw 11*a*. As shown in FIG. 2, the claw 11*a* is located between the two claws 12*a* and 12*b* of the second member 12 when the gate is in the closed position. When the gate is in the closed position, the claw 11*a* of the first member 11 and the claws 12*a* and 12*b* of the second member 12 close the opening of the chute 160. The three claws 11*a*, 12*a*, and 12*b* close substantially the entire area of the opening.

The first member 11 is rotatably supported at an end portion thereof on the upstream side in the transport direction by a shaft 11*b*. The shaft 11*b* is disposed on the upstream side in the transport direction within the opening such that the axial direction thereof coincides with a direction (Y axis direction) perpendicular to the transport direction. As shown in FIG. 2, a planar shape of the first member 11 as viewed from above is a T-shape in which the claw 11*a* having a substantially rectangular thin plate shape extends downstream in the transport direction from a tubular main body through which the shaft 11*b* is inserted.

The second member 12 is rotatably supported at an end portion thereof on the downstream side in the transport direction by a shaft 12*c*. The shaft 12*c* is disposed on the downstream side in the transport direction within the opening such that the axial direction thereof coincides with the direction (Y axis direction) perpendicular to the transport direction. As shown in FIG. 2, a planar shape of the second member 12 as viewed from above is a U-shape in which the two claws 12*a* and 12*b* each having a substantially rectangular thin plate shape extend parallel to each other upstream in the transport direction from a tubular main body through which the shaft 12*c* is inserted.

The first member 11 and the second member 12 rotate between the closed position shown in FIG. 2 and the opened position shown in FIG. 3. As shown by an arrow in the lower diagram of FIG. 3, the first member 11 rotates around the shaft 11*b* from the closed position to the opened position at the lower side. By the rotation, the claw 11*a* moves to the lower side of the transport surface. The second member 12 rotates around the shaft 12*c* from the closed position to the opened position at the upper side. By the rotation, the claws 12*a* and 12*b* move to the upper side of the transport surface. The lower side is a Z-axis negative direction. Specifically, in the direction perpendicular to the transport surface, the lower side is the direction toward the inner side of the coin handling apparatus 1 with respect to the transport surface. The upper side is the Z-axis positive direction. Specifically, in the direction perpendicular to the transport surface, the upper side is the direction toward the outer side of the coin handling apparatus 1 with respect to the transport surface.

As shown in FIG. 3, the second member 12 rotates to a position at which the ends, on the upstream side in the transport direction, of the claws 12*a* and 12*b* become higher than the lower end of the transport pin 41 and the lower end of the transport belt 40. At this position, the transport belt 40 and the transport pin 41 pass between the claw 12*a* and the claw 12*b* of the second member 12. That is, the second member 12 has a shape in which a part thereof on the upstream side in the transport direction is cut out such that the transport belt 40 and the transport pin 41 can pass therethrough when the second member 12 is at the opened position. When the gate is closed, the claw 11*a* of the first member 11, which is disposed so as to oppose the second member 12, closes the cut-out area of the second member 12 such that coins are not dropped through this cut-out area. While opening the gate, the first member 11 rotates downward as the second member 12 rotates upward, such that the claw 11*a* does not prevent a coin from being dropped.

A distance c shown in the lower diagram of FIG. 3 indicates the distance from the center of the shaft 11*b* of the first member 11 to a position at which the coin 100 collides against the lower surface of the second member 12 of the opened position when the coin 100 moves straight along the transport surface. The distance c is set so as to be larger than half the diameter D of the coin having a maximum diameter (c>(D/2)). Thus, before the leading end, in the transport direction, of the coin 100 collides against the second member 12, more than half of the lower surface of the coin 100 loses support by the transport surface, so that the leading end moves downward and the coin 100 is dropped into the chute 160.

When the coin 100 is transported at a high speed, the inertial force acting on the coin 100 is increased, so that the coin 100 may move in the transport direction even after the support of the lower coin surface is lost. In this case, the coin 100 collides against the lower surface of the second member 12 of the opened position and is dropped. That is, the second member 12 rotates to the opened position at which at least a part thereof is higher than the coin 100 on the transport surface, and functions as an obstacle that prevents passage of the coin 100. Because of both the function of the second member 12 as an obstacle and the influence of gravity, the direction of movement of the coin 100 is changed. The second member 12 functions as an obstacle for the coin 100 that is to move past the opening, and thus the coin 100 is reliably dropped into the chute 160.

Figure 4:
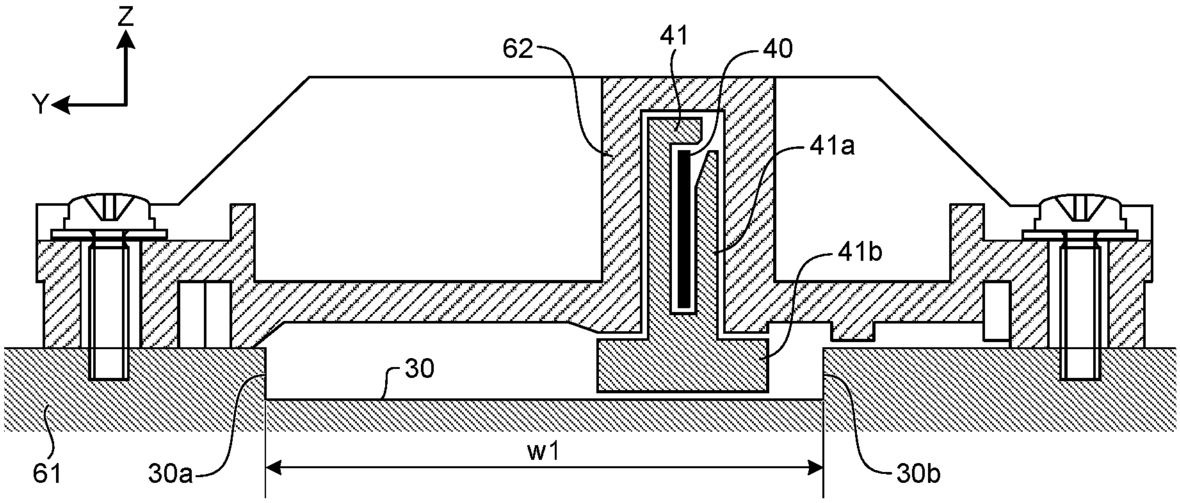
FIG. 4 illustrates an example of a guide member that guides transport pins.

The coin handling apparatus 1 includes a guide member 62 that guides the transport pins 41. FIG. 4 illustrates an example of the guide member 62. FIG. 4 shows a view of the transport path 30 as viewed from the downstream side in the transport direction (from the X-axis negative direction side). The position of the guide member 62 is fixed with respect to the transport path 30. For example, as shown in FIG. 4, the guide member 62 is fixed to a member 61 on which the transport path 30 is formed. The guide member 62 extends along the transport belt 40 and guides the transport pins 41 over substantially the entire area of the transport path 30.

As shown in FIG. 4, a cross-sectional shape of each transport pin 41, which is mounted on the transport belt 40, is a T-shape including a vertical portion 41*a* and a horizontal portion 41*b*. A groove is formed on the guide member 62 so as to correspond to the vertical portion 41*a* of the transport pin 41. The vertical portion 41*a* of the transport pin 41 moves while being guided by the groove, and the horizontal portion 41*b* located outside the groove pushes a coin. Movement of the transport pin 41 in the transport path width direction (Y axis direction) and the upward direction (Z-axis positive direction) is restricted by the groove of the guide member 62. The distance between the lower surface of the transport pin 41 and the transport surface of the transport path 30 is set to a value smaller than the thickness of a coin having a minimum thickness among coins to be handled. For example, the distance is set to 0.3 to 0.5 mm. Owing to the restriction by the guide member 62, the transport pin 41 does not move in the transport path width direction nor does it move in the up-down direction. Accordingly, transport of coins on the transport path 30 and dropping of coins from the transport path 30 into the chutes 160 are reliably performed.

Figure 5A:
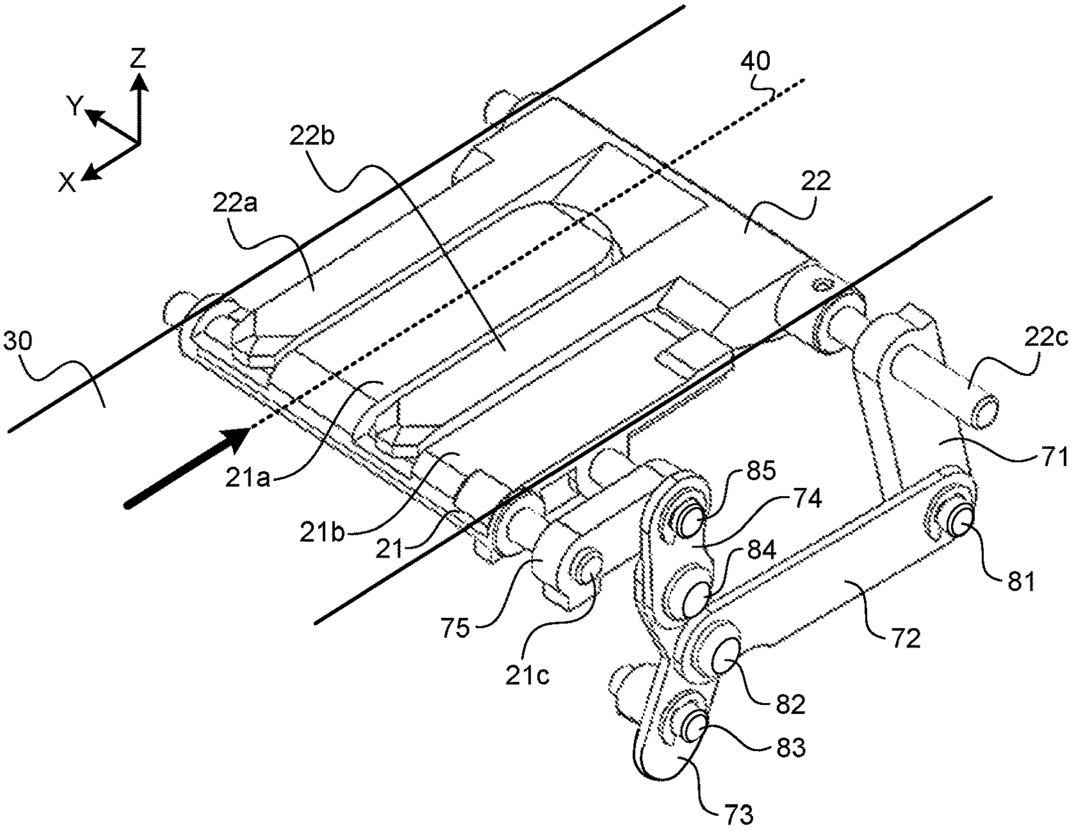
FIGS. 5A and 5B illustrate an example of the gate.
Figure 5B:
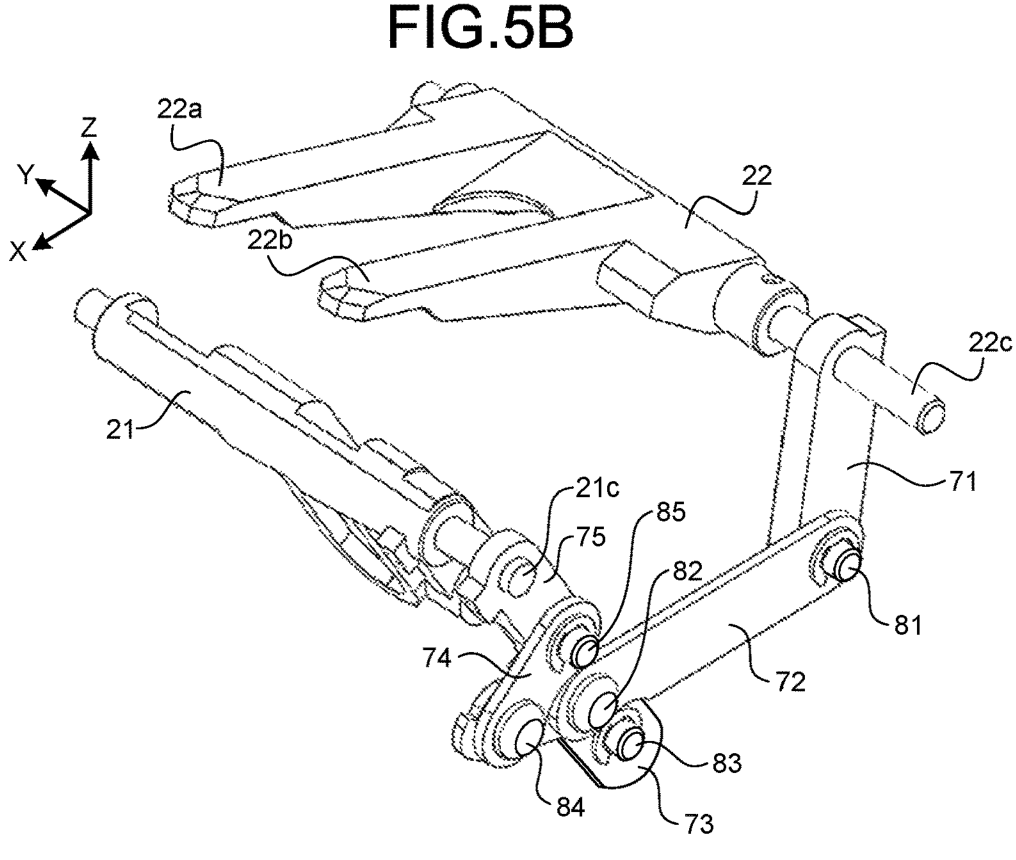

Next, a specific example of the gate will be described. FIGS. 5A and 5B illustrate an example of the gate. FIG. 5A illustrates a state where the gate is closed, and FIG. 5B illustrates a state where the gate is opened. An arrow shown in FIG. 5A indicates the transport direction of coins, and a broken line shown in FIG. 5A indicates a position on which the transport belt 40 and the transport pins 41 pass. When a second member 22 has rotated upward to open the gate as shown in FIG. 5B, the transport belt 40 and the transport pin 41 pass between a claw 22*a* and a claw 22*b*.

Similar to the gate shown in FIG. 2 and FIG. 3, the gate shown in FIGS. 5A and 5B closes and opens the opening formed in the transport surface by using two members that are a first member 21 and the second member 22. Whereas the first member 11 shown in FIG. 2 and FIG. 3 includes one claw 11*a*, the first member 21 shown in FIGS. 5A and 5B includes two claws 21*a* and 21*b*. The structure shown in FIGS. 5A and 5B is realized by reducing the width, in the transport path width direction, of the claw 12*b* of the second member 12 shown in FIG. 2 and FIG. 3 and adding the claw of the first member 11 to the width-reduced area. When the first member 21 and the second member 22 are in a closed position shown in FIG. 5A, substantially the entire area of the opening formed in the transport path 30 is closed by the claws 21*a* and 21*b* of the first member 21 and the claws 22*a* and 22*b* of the second member 22.

The gate shown in FIGS. 5A and 5B includes a link mechanism that connects the first member 21 and the second member 22. The first member 21 and the second member 22, which are connected to each other by the link mechanism, move in conjunction with each other. The link mechanism is constituted by connecting plates including three plates 71, 72, and 74 each having an I-shaped thin plate shape, and one plate 73 having an L-shaped thin plate shape.

As shown in FIG. 5A, the second member 22 includes: a main body through which a shaft 22*c* is inserted; and the two claws 22*a* and 22*b* that extend onto a shaft 21*c* of the first member 21 from the main body. When the second member 22 rotates from the closed position shown in FIG. 5A to the opened position shown in FIG. 5B and returns to the closed position, the tips of the claws 22*a* and 22*b* come into contact with the shaft 21*c* of the first member 21 and the second member 22 stops.

The shaft 22*c* is fixed to the main body of the second member 22. The plate 71 is fixed to the shaft 22*c*. An axial direction of the shaft 22*c* coincides with the direction (Y axis direction) perpendicular to the transport direction. The shaft 22*c* is rotatably supported at both ends thereof. When the shaft 22*c* rotates, the second member 22 and the plate 71 rotate together with the shaft 22*c*.

The plate 71 is fixed at one end side thereof to the shaft 22*c* and rotatably connected at another end side thereof to the plate 72 by a shaft 81. The plate 72 is connected at one end side thereof to the plate 71 and rotatably connected at another end side thereof to the plate 73 by a shaft 82. The L-shaped plate 73 is connected at a corner of the L shape thereof to the plate 72. The plate 73 is rotatably supported at one end side thereof by a shaft 83 and rotatably connected at another end side thereof to the plate 74 by a shaft 84. The plate 74 is connected at one end side thereof to the plate 73 and rotatably connected at another end side thereof to a shaft 85. The axial directions of the shafts 81 to 85 coincide with the direction (Y axis direction) perpendicular to the transport direction.

The first member 21 includes: a main body through which the shaft 21*c* is inserted; and the two claws 21*a* and 21*b* that extend from the main body toward the downstream side in the transport direction. The shaft 21*c* is fixed to the main body of the first member 21. An axial direction of the shaft 21*c* coincides with the direction (Y axis direction) perpendicular to the transport direction. The shaft 21*c* is rotatably supported at both ends thereof. The first member 21 includes the shaft 85 at a position away from the shaft 21*c* on the downstream side in the transport direction (on the X-axis negative direction side). The shaft 85 is fixed to the claw 21*b* of the first member 21. When the shaft 85 is pulled downward, the first member 21 rotates downward around the shaft 21*c*.

A plate 75 is fixed at one end side thereof to the shaft 21*c* and fixed at another end side thereof to the shaft 85. A positioning member that is not shown is disposed outside the transport path 30 so as to correspond to the position of the plate 75. The positioning member is fixed at a position at which the lower surface thereof is in contact with the upper surface of the plate 75 of the closed position shown in FIG. 5A. When the first member 21 rotates from the closed position shown in FIG. 5A to the opened position shown in FIG. 5B and returns to the closed position, the upper surface of the plate 75 comes into contact with the lower surface of the positioning member and the first member 21 stops. At this time, a part of the upper surface of the claw 21*b* of the first member 21 also comes into contact with the lower surface of the positioning member. The method for stopping the first member 21 at the closed position is not limited to the described method. For example, only the plate 75 may be brought into contact with the positioning member, or only a part of the upper surface of the first member 21 may be brought into contact with the positioning member.

When a driving unit that is not shown rotationally drives one member of the first member 21 and the second member 22, the other member connected by the link mechanism also rotates in conjunction with the one member. An example of an operation of the first member 21 and the second member 22 will be described with the case where the driving unit rotationally drives the shaft 22*c* of the second member 22.

Figure 6A:
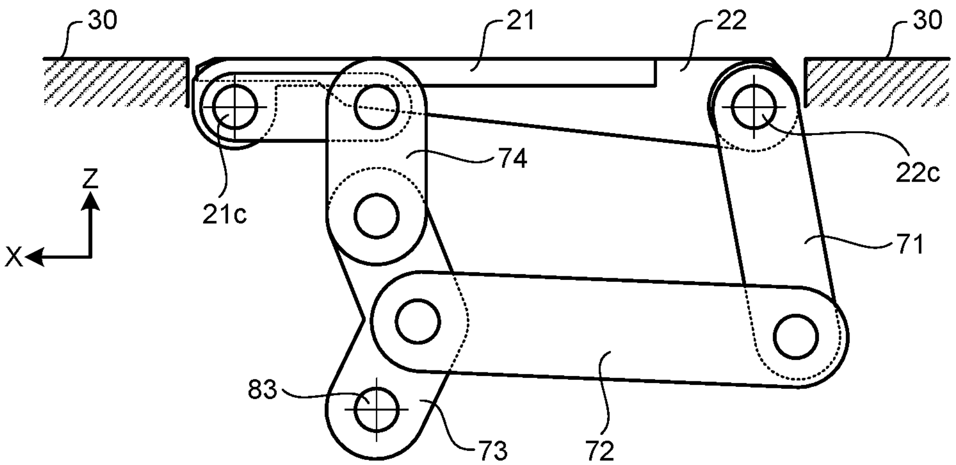
FIGS. 6A to 6C are schematic diagrams for describing an opening and closing operation of the gate by a link mechanism.
Figure 6B:
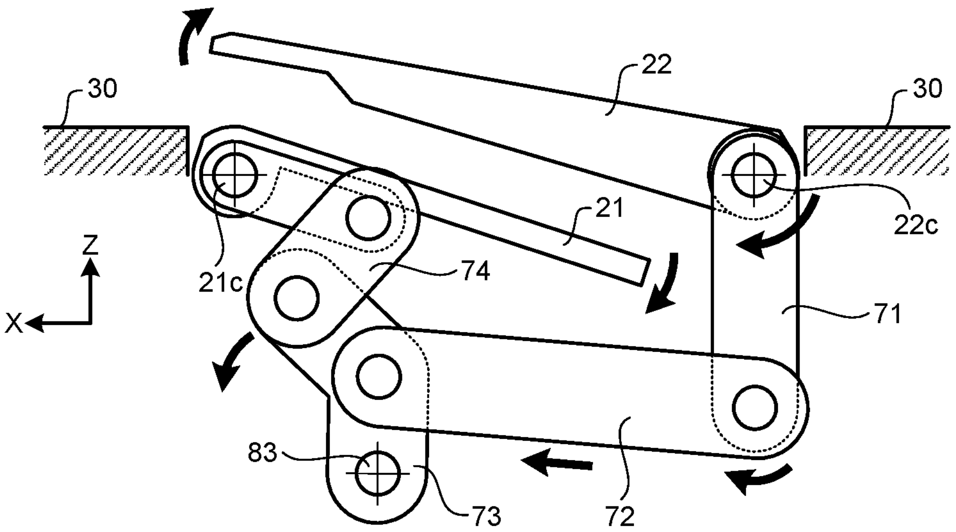
Figure 6C:
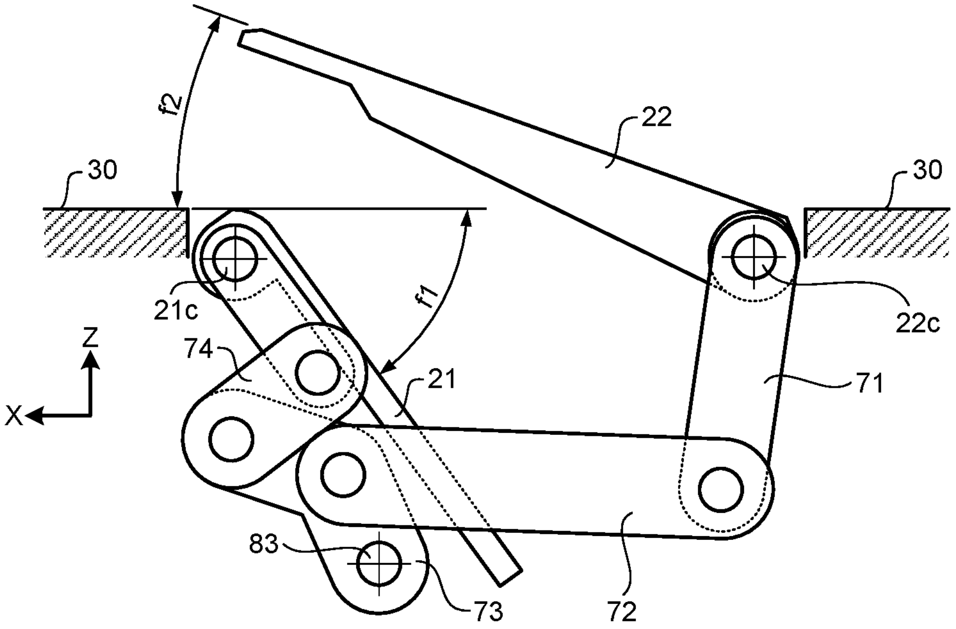

FIGS. 6A to 6C are schematic diagrams for describing an opening and closing operation of the gate by the link mechanism. FIG. 6A illustrates a state where the gate is closed, that is, a state where the first member 21 and the second member 22 are in the closed position. FIG. 6C illustrates a state where the gate is opened, that is, a state where the first member 21 and the second member 22 are in the opened position. FIG. 6B illustrates a state in the middle of opening of the gate, that is, a state in the middle of movement of the first member 21 and the second member 22 from the closed position to the opened position. The positions of the shaft 21*c*, the shaft 22*c*, and the shaft 83 are fixed.

As shown in FIG. 6A, in the closed position where the gate is closed, the upper surfaces of the first member 21 and the second member 22 form a flat surface that is substantially flush with the transport surface of the transport path 30. A coin being transported on the transport path 30 passes over the first member 21 and the second member 22 and is transported further downstream in the transport direction.

While opening the gate, the shaft 22*c* shown in FIG. 6A is driven to rotate clockwise. While closing the gate, the shaft 22*c* shown in FIG. 6C is driven to rotate counterclockwise. The driving unit that is not shown rotates the shaft 22*c* between the closed position shown in FIG. 6A and the opened position shown in FIG. 6C. That is, the driving unit rotates the second member 22 between the closed position and the opened position. For example, a rotary solenoid (swing selector) is used as the driving unit. The rotary solenoid is just one example of a drive motor that could be used to control movement of the gate. Other electromechanical devices may be employed to control the opening and closing of the gate.

The second member 12 starts rotating from the closed position to the opened position with rotation of the shaft 22*c* as shown by an arrow in FIG. 6B. The plate 71, which is fixed at one end thereof to the shaft 22*c*, rotates clockwise. By the rotation of the plate 71, the position of the plate 72 moves to the upstream side in the transport direction (the left side in FIGS. 6A to 6C). The L-shaped plate 73, which is supported by the shaft 83, is pushed at the corner of the L shape thereof by the plate 72 to rotate counterclockwise. By the rotation of the plate 73, the plate 74 moves downward while rotating. The first member 21 starts rotating from the closed position to the opened position with the downward movement of the plate 74.

The first member 21 and the second member 22 that have started rotating as shown in FIG. 6B stop at a maximum position in a preset operating range of the driving unit. This position is the opened position at which the first member 21 and the second member 22 stop. FIG. 6C illustrates the first member 21 and the second member 22 in the opened position. The link mechanism, which causes the first member 21 and the second member 22 to move in conjunction with each other, is formed such that a rotation angle f1 of the first member 21 shown in FIG. 6C is larger than a rotation angle f2 of the second member 22. As a result, in the opened position, the gap between the first member 21 and the second member 22 is larger on the downstream side than on the upstream side in the transport direction.

While opening the gate, the claws 22*a* and 22*b* of the second member 22 disposed to support, from below, a coin being transported on the transport path 30 move to the opened position. In the opened position, the claws 22*a* and 22*b* are located above the coin and the coin is supported only by the first member 21. A small-diameter coin has a small area of contact with the first member 21, and thus the lower coin surface the support of which has been lost easily moves downward and the coin surfaces stand up. In the case where a position at which the gap between the upper surface of the first member 21 and the lower surface of the second member 22 is narrow and the upper surface of the first member 21 and the lower surface of the second member 22 are substantially parallel to each other as shown in FIG. 6B is set as the opened position, the gap may be clogged with a standing small-diameter coin. Thus, the angles f1 and f2 are set such that clogging with a standing small-diameter coin is prevented. For example, the angles f1 and f2 are set such that, even at a position at which the gap between the upper surface of the first member 21 and the lower surface of the second member 22 at the opened position shown in FIG. 6C is the narrowest, the gap is larger than the minimum diameter d of the coin having a minimum diameter.

In order to drop a coin into the chute 160, it is preferable that the first member 21 greatly rotates downward. On the other hand, it is sufficient that the second member 22 rotates upward to a position at which the second member 22 prevents passage of a coin transported thereto on the transport path 30. Thus, the angles f1 and f2 are set such that the gap between the first member 21 and the second member 22 becomes wide and the rotation angle f1 of the first member 21 is larger than the rotation angle f2 of the second member 22. For example, the link mechanism is formed such that: the angle f1 by which the first member 21 rotates from the closed position to the opened position is about 65 degrees; and the angle f2 by which the second member 22 rotates from the closed position to the opened position is about 20 degrees.

After the gate has been opened and a coin has been dropped into the chute 160, the driving unit drives the shaft 22*c* shown in FIG. 6C to rotate counterclockwise in order to close the gate. When the shaft 22*c* rotates counterclockwise, the respective plates 71 to 74, which form the link mechanism, move in directions opposite to those when the gate is opened. As a result, the first member 21 and the second member 22 return from the opened position shown in FIG. 6C through the intermediate state shown in FIG. 6B to the closed position shown in FIG. 6A to close the gate.

Figure 7A:
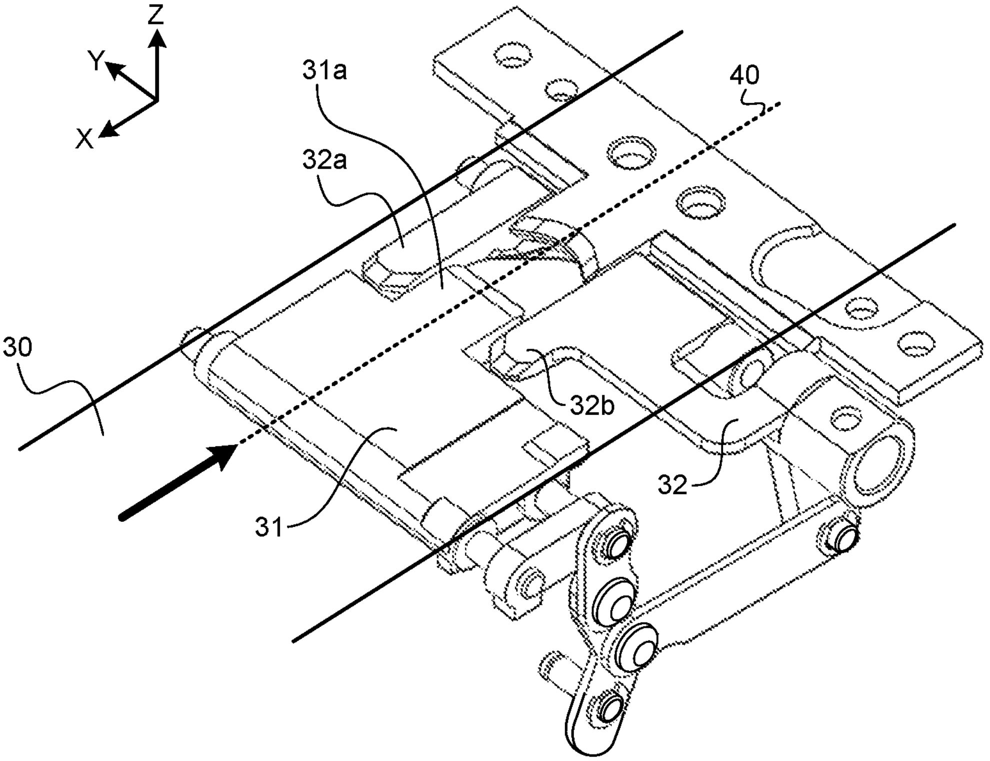
FIGS. 7A and 7B are schematic diagrams illustrating an example in which the shapes of a first member and a second member shown in FIGS. 5A and 5B are different.
Figure 7B:
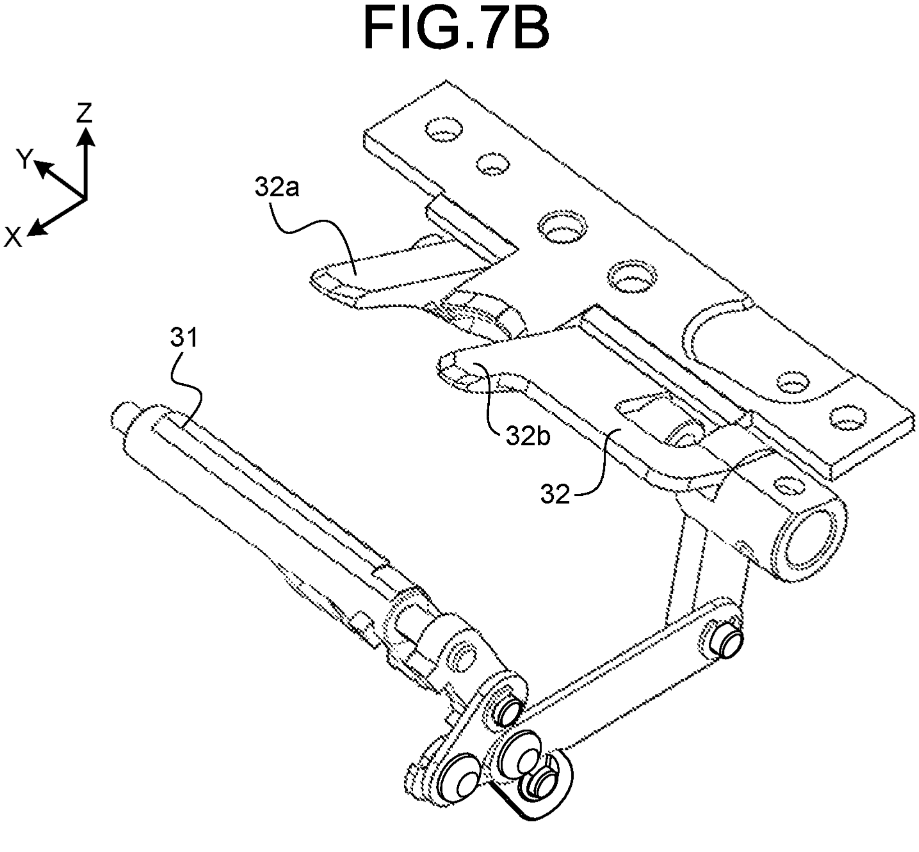

The structure of the gate is not limited to the above-described examples. FIGS. 7A and 7B are schematic diagrams illustrating an example in which the shapes of the first member and the second member shown in FIGS. 5A and 5B are different. FIG. 7A illustrates a state where the gate is closed, and FIG. 7B illustrates a state where the gate is opened. An arrow shown in FIG. 7A indicates the transport direction of coins transported on the transport path 30, and a broken line in FIG. 7A indicates a position on which the transport belt 40 and the transport pins 41 pass.

The present embodiment is not limited to the above described examples in which substantially the entire area of the opening formed in the transport path 30 is closed when the gate is closed as shown in FIG. 2 and FIG. 5A. In another example, a part of the opening is not closed and a gap is left as shown in FIG. 7A. It is allowable that a gap leading to the chute 160 is left between a first member 31 and a second member 32 in the closed position as long as coins transported on the transport path 30 are not dropped through the gap when the gate is being closed.

Figure 8A:
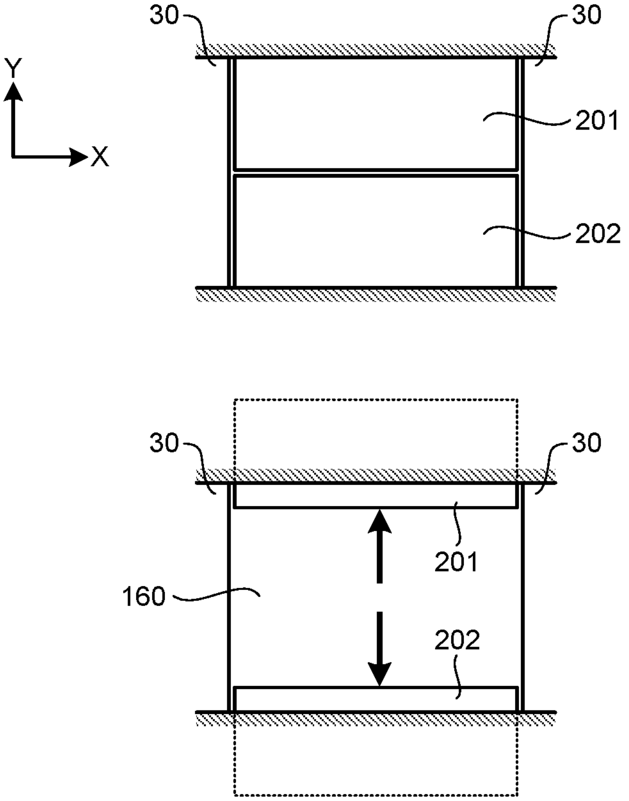
FIGS. 8A and 8B each show schematic diagrams illustrating an example in which the opening and closing operation of the gate is different.
Figure 8B:
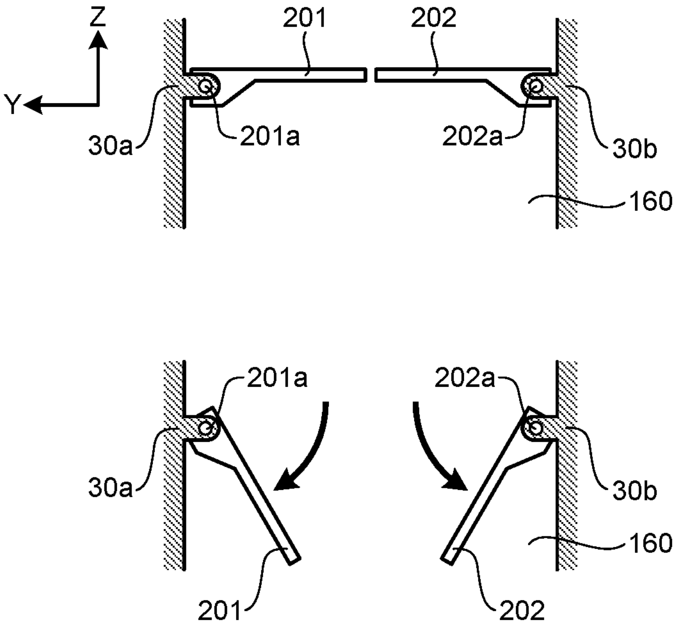

The number of members forming the gate and the opening and closing operation of the gate are not limited to the above-described examples. FIGS. 8A and 8B each show schematic diagrams illustrating an example in which the opening and closing operation of the gate is different. The upper diagrams of FIGS. 8A and 8B each illustrate a state where the gate is closed by a plurality of members 201 and 202 in a closed position, and the lower diagrams of FIGS. 8A and 8B each illustrate the respective members 201 and 202 that move to an opened position to open the gate.

The gate shown in FIG. 8A includes the members 201 and 202 that are disposed so as to be slidable. The two members 201 and 202, which close the opening of the chute 160 as shown in the upper diagram of FIG. 8A, move in parallel to both outer sides in the transport path width direction, respectively, as shown in the lower diagram of FIG. 8A to open the opening.

The members 201 and 202 shown in the upper diagram of FIG. 8A may be rotatably supported by the side walls 30*a* and 30*b* of the transport path 30 as shown in the upper diagram of FIG. 8B. The opening of the chute 160 can be opened by rotating the two members 201 and 202 downward as shown in the lower diagram of FIG. 8B.

Figure 9:
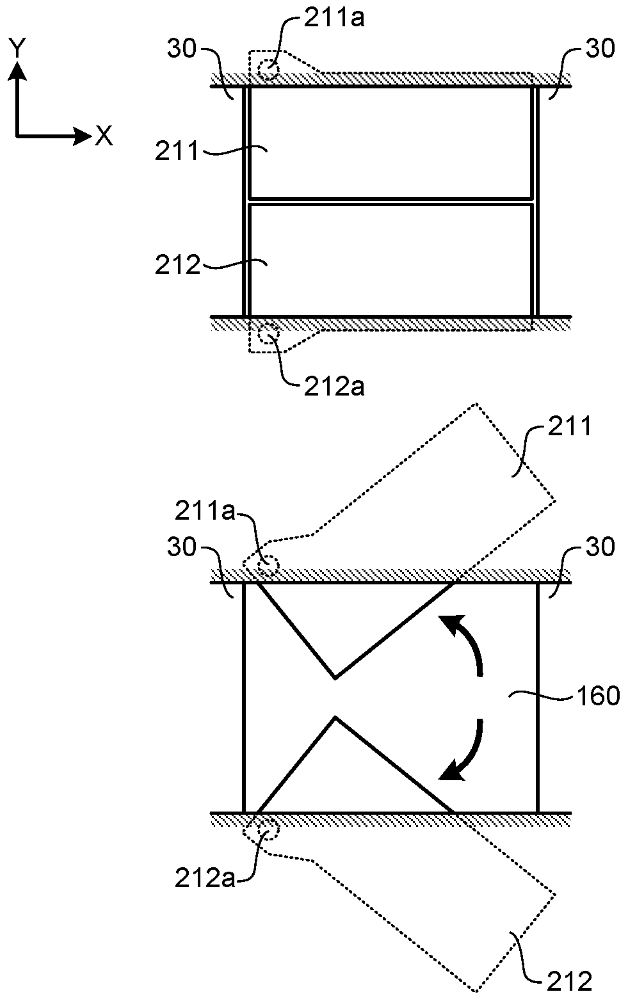
FIG. 9 shows schematic diagrams illustrating still another example in which the opening and closing operation of the gate is different.

FIG. 9 shows schematic diagrams illustrating still another example in which the opening and closing operation of the gate is different. The upper diagram of FIG. 9 illustrates a state where the gate is closed by a plurality of members 211 and 212 in a closed position, and the lower diagram of FIG.

9 illustrates the respective members 211 and 212 that move to an opened position to open the gate.

The gate shown in FIG. 9 includes the members 211 and 212 that are disposed so as to be rotatable to the outer side in the transport path width direction. The two members 211 and 212, which close the opening of the chute 160 as shown in the upper diagram of FIG. 9, rotate around shafts 211*a* and 212*a*, respectively, to the outside of the transport path as shown in the lower diagram of FIG. 9 to open the opening. The present embodiment is not limited to the example in which the shafts 211*a* and 212*a* are disposed downstream of the members 211 and 212 in the transport direction. In another example, the shafts 211*a* and 212*a* are disposed upstream of the members 211 and 212 in the transport direction.

Figure 10A:
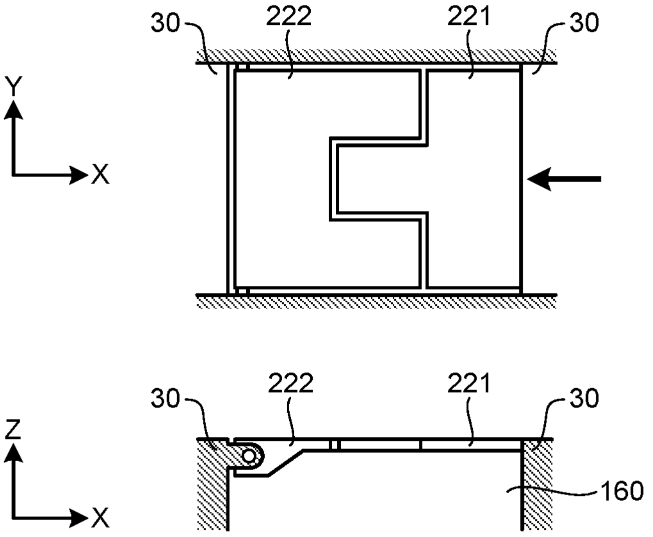
FIGS. 10A and 10B show schematic diagrams illustrating an example in which the gate includes a plurality of types of members having different opening and closing operations.
Figure 10B:
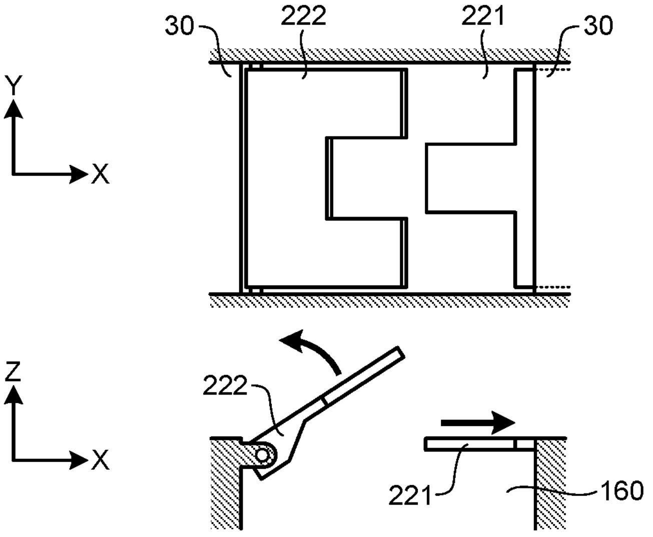

FIGS. 10A and 10B show schematic diagrams illustrating an example in which the gate includes a plurality of types of members having different opening and closing operations. FIG. 10A illustrates a state where the gate is closed by a plurality of members 221 and 222 in a closed position, and FIG. 10B illustrates the respective members 221 and 222 that move to an opened position to open the gate. The upper diagrams of FIGS. 10A and 10B each show a view of the transport path 30 as viewed from above, and the lower diagrams of FIGS. 10A and 10B each show a view of the transport path 30 as viewed from a lateral side.

An arrow shown in FIG. 10A indicates the transport direction of coins. The gate includes the first member 221 and the second member 222. The first member 221 slides and is retracted below the transport surface. The second member 222 rotates upward from the transport surface like the second members 12 and 22 shown in FIG. 2 and FIGS. 5A and 5B.

The second member 222 has a thin plate shape including a recessed part obtained by cutting out a part thereof on the upstream side in the transport direction. When the second member 222 rotates upward to open the gate, the transport belt 40 and the transport pins 41 pass through the recessed part cut out from the second member 222. The first member 221 has a thin plate shape including a projected part formed so as to correspond to the recessed part of the second member 222. When the gate is closed, the recessed part of the second member 222 is closed by the projected part of the second member 222. Substantially the entire area of the opening of the chute 160 can be closed by the first member 221 and the second member 222.

As shown in FIG. 10B, while opening the gate, whereas the first member 221 slides to the upstream side in the transport direction, the second member 222 rotates upward. The present embodiment is not limited to an example in which all the members forming the gate slide or rotate to open or close the gate, and the gate may include the members that move in different manners as shown in FIGS. 10A and 10B.

Figure 11A:
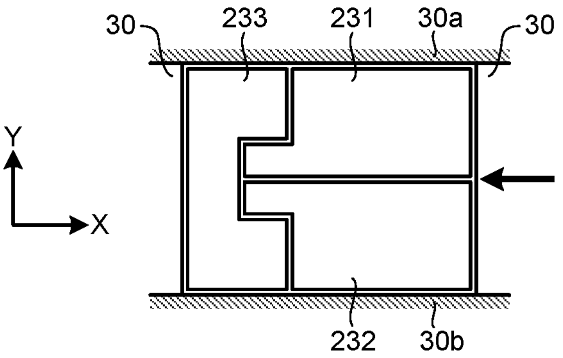
FIGS. 11A to 11D show schematic diagrams illustrating examples of a gate including three or more members.

FIGS. 11A to 11D are schematic diagrams illustrating examples of gates including three or more members. FIG. 11A shows a view of the transport path 30, as viewed from above, in a state where the gate is closed by a plurality of members 231 to 233 in a closed position. An arrow in FIG. 11A indicates the transport direction of coins. The first member 231 and the second member 232 are rotatably supported by the side walls 30*a* and 30*b* of the transport path 30, respectively. Similar to the second members 12 and 22 shown in FIG. 2 and FIGS. 5A and 5B, the third member 233 is disposed so as to be rotatable upward from the transport surface.

The third member 233 has a thin plate shape including a recessed part obtained by cutting out a part thereof on the upstream side in the transport direction. When the third member 233 rotates upward to open the gate, the transport belt 40 and the transport pins 41 pass through the recessed part cut out from the third member 233. The first member 231 and the second member 232 each have a thin plate shape including a projected part formed on the downstream side in the transport direction so as to correspond to the recessed part of the third member 233. When the gate is closed, the recessed part of the third member 233 is closed by the projected part of the first member 231 and the projected part of the second member 232. Substantially the entire area of the opening of the chute 160 can be closed by the first member 231, the second member 232, and the third member 233.

Figure 11B:
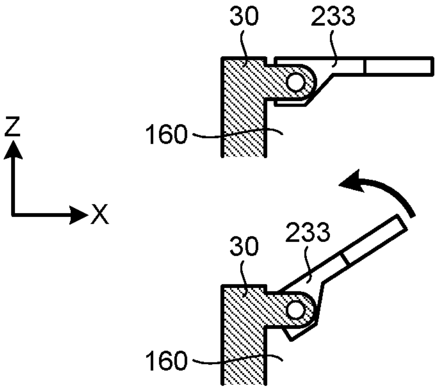
Figure 11C:
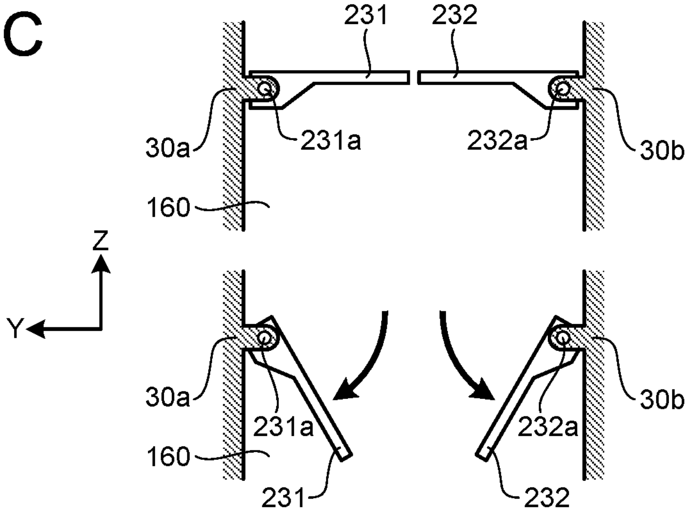

The upper diagram of FIG. 11B shows a view of the third member 233 in the closed position as viewed from a lateral side of the transport path 30. The lower diagram of FIG. 11B illustrates the third member 233 that rotates to an opened position. The upper diagram of FIG. 11C shows a view of the first member 231 and the second member 232 in the closed position as viewed from the downstream side in the transport direction The lower diagram of FIG. 11C illustrates the first member 231 and the second member 232 that rotate to the opened position. While opening the gate, the third member 233 rotates upward as shown in FIG. 11B, and the first member 231 and the second member 232 rotate downward as shown in FIG. 11C.

Figure 11D:
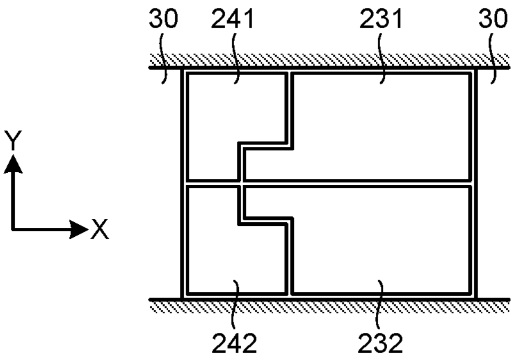

FIG. 11D illustrates an example in which the third member 233 shown in FIG. 11A is divided into two members 241 and 242. By rotatably supporting the respective members 241 and 242 similar to the third member 233, the respective members 241 and 242 can rotate upward similar to the third member 233 shown in FIG. 11B to open the gate. As described above, the gate may include three or more members.

In the present embodiment, the transport path 30 is provided so as to be inclined, and a coin is transported in a state where the coin is shifted to the one side wall 30*b*. However, the configuration of the transport path 30 is not limited thereto, and the transport path 30 may be provided horizontally.

In the present embodiment, a plurality of members forming the gate close substantially the entire area of the opening formed in the transport surface of the transport path 30. However, a partial area of the opening may be closed as long as coins transported on the transport path 30 are not dropped into the opening when the gate is being closed. That is, a gap may be formed between the members in the closed position. For example, as shown in FIG. 2, in the case where the second member 12 has a shape in which the area, where the transport belt 40 and the transport pins 41 pass at the opened position, is cut out from the upstream side in the transport direction, the first member 11 has a shape to close at least a part of the cut-out area. Specifically, the shape of the claw 11*a* of the first member 11 shown in FIG. 2 may be a shape that is short in the X axis direction or thin in the Y axis direction.

The shape of each member forming the gate and movement of each member when opening and closing the gate are not particularly limited as long as coins on the transport path 30 are not dropped into the chute 160 when the gate is closed, and coins on the transport path 30 can be dropped into the chute 160 when the gate is opened. For example, for weight reduction, each member may have a mesh shape with through holes or may have a strip shape with long though holes. Alternatively, for example, a member that moves in parallel in the up-down direction may move upward from a closed position, at which the member forms a part of the transport surface of the transport path 30, to an opened position in order to prevent passage of a coin transported along the transport surface, thereby dropping the coin into the opening.

As described above, the coin handling apparatus includes: a transport path having a transport surface in which an opening for dropping a coin is formed; a transport unit configured to transport a coin on the transport surface along the transport path; a gate configured to move between a closed position for closing the opening such that a coin transported by the transport unit is not dropped into the opening, and an opened position for opening the opening such that the coin is dropped into the opening; and a driving unit configured to drive the gate, wherein the gate includes a plurality of members configured to close the opening when the gate is in the closed position.

The plurality of members of the gate include at least one of a member configured to rotate from the closed position to the opened position and a member configured to move in parallel from the closed position to the opened position.

The plurality of members of the gate include a member configured to prevent passage of a coin transported on the transport surface and drop the coin into the opening, when the gate is in the opened position.

The gate is configured to form a flat surface that is substantially flush with the transport surface when the gate is in the closed position.

The plurality of members of the gate include: a first member disposed upstream in a transport direction of coins and configured to start rotating in a first direction from the closed position toward the opened position; and a second member disposed downstream in the transport direction and configured to start rotating in a second direction opposite to the first direction, from the closed position toward the opened position.

The first direction and the second direction are perpendicular to the transport surface.

The first member is configured to rotate around a first shaft disposed upstream in the transport direction within the opening, and the second member is configured to rotate around a second shaft disposed downstream in the transport direction within the opening.

The transport unit includes a transport pin configured to transport a coin on the transport surface by pushing the coin, and the second member has a shape in which an area, where the transport pin passes, when the gate is in the opened position, is cut out.

The first member has a shape to close at least a part of the cut-out area of the second member when the gate is in the closed position.

The coin handling apparatus includes a link mechanism configured to connect the first member and the second member such that the first member and the second member move in conjunction with each other when opening and closing the gate.

An angle by which the first member rotates from the closed position to the opened position is larger than an angle by which the second member rotates from the closed position to the opened position.

As described above, the coin handling apparatus has the openings formed in the transport path for coins, and dropping of a coin into each opening is controlled by opening and closing the gate including a plurality of members. With the structure to close the opening by a plurality of members, each member can be reduced in weight and movement of each member for opening and closing the opening can be reduced, as compared to the case where one member closes the opening. Accordingly, even when coins are transported on the transport path at a high speed, only a coin to be dropped can be dropped into the opening.

At least a part of at least one of the members forming the gate is located above the transport surface when the gate is opened, thereby preventing passage of a coin transported thereto on the transport surface. The coin collides against the part located above the transport surface and is dropped, so that the coin can be reliably dropped into the opening.

As described above, the coin handling apparatus according to the present disclosure is useful for dropping only a coin to be dropped, into an opening formed in a transport path.

What is claimed is:

1. A coin handling apparatus, comprising:

a conveyor that is provided with a transport path which has a transport surface, and that includes a pin which pushes a coin on the transport surface to transport the coin along the transport path in a transport direction from an upstream side of the transport path to a downstream side of the transport path, the transport surface provided with an opening portion through which the transported coin is dropped;

a gate disposed at the opening portion of the transport surface, the gate opening and closing the opening portion by moving between a closed position and an opened position, wherein in a case that the gate is positioned at the closed position, the opening portion is closed and the transported coin is not dropped through the opening portion, and in a case that the gate is positioned at the opened position, the opening portion is open and the transported coin is dropped through the opening portion; and a drive motor that moves the gate between the closed position and the opened position, wherein the gate includes a first member disposed on the upstream side of the transport path and a second member disposed on the downstream side of the transport path, the first member is supported, by a first shaft, at an end portion thereof on the upstream side of the transport path, the first member is rotatable about a first axis of the first shaft, the first axis being perpendicular to the transport direction, the second member is supported, by a second shaft, at an end portion thereof on the downstream side of the transport path, the second member is rotatable about a second axis of the second shaft, the second axis being perpendicular to the transport direction, the first member rotates about the first axis in a first rotation direction and the second member rotates about the second axis in a second rotation direction opposite to the first rotation direction, respectively, as the gate moves from the closed position to the opened position, the second member has a shape in which a part thereof on the upstream side in the transport direction is cut out such that the conveyor and the pin can pass therethrough when the gate is at the opened position, and when the gate is at the closed position, the first member closes the cut-out area of the second member and the first member and the second member form a surface that is flush with the transport surface of the transport path.

2. The coin handling apparatus of claim 1, wherein the conveyor transports the coin on an upper surface of the first member to an upper surface of the second member when the gate is in the closed position.

3. The coin handling apparatus of claim 2, wherein the drive motor moves the gate to rotate the first member and the second member in different rotation directions such that the coin is dropped through the opening portion when the gate is in the opened position.

4. The coin handling apparatus of claim 1, wherein a part of the first member moves below the transport surface and a part of the second member moves above the transport surface of the transport path when the gate is in the opened position.

5. The coin handling apparatus of claim 1, wherein an upper surface of the first member and an upper surface of the second member are substantially flush with the transport surface of the transport path when the gate is in the closed position.

6. The coin handling apparatus of claim 1, wherein the second member has a shape including an opening in an area where the pin, which pushes the coin, passes when the gate is in the opened position.

7. The coin handling apparatus of claim 6, wherein the first member has a shape that coincides with the opening, through which the pin pushing the coin passes, of the second member and prevents the coin from dropping into the opening in a case that the gate is in the closed position.

8. The coin handling apparatus of claim 6, wherein the opening of the second member is a cut-out formed on the upstream side in the transport direction of the second member.

9. The coin handling apparatus of claim 1, further comprising:

a link structure configured to connect the first member and the second member such that movement of the first member and the second member is synchronized in a case that the gate opens and closes the opening portion of the transport surface.

10. The coin handling apparatus of claim 1, wherein an angle by which the first member rotates from the closed position to the opened position is larger than an angle by which the second member rotates from the closed position to the opened position.

11. The coin handling apparatus of claim 1, wherein the conveyor includes a transport belt that includes a transport pin to push the coin along the transport path.

12. The coin handling apparatus of claim 1, wherein the transport direction is a horizontal direction that is different from a direction along which the coin drops from the opening portion.

13. The coin handling apparatus of claim 1, wherein the transport surface of the transport path is inclined against a vertical direction.

14. The coin handling apparatus of claim 1, wherein the transport path is provided with a plurality of chutes, and each chute of the plurality of chutes has an opening portion and a corresponding gate, of a plurality of gates, which is disposed at the opening portion, and the opening portion is opened and closed separately by each gate.

15. The coin handling apparatus of claim 1, wherein the first member includes a first claw and a second claw, and the second member includes a main body, a third claw and a fourth claw.

16. The coin handling apparatus of claim 15, wherein the second shaft is inserted into the main body, and the third claw and the fourth claw extend onto the first shaft.

17. The coin handling apparatus of claim 16, wherein the second shaft is fixed to the main body.

18. The coin handling apparatus of claim 15, wherein in a case that second member rotates from the opened position to return to the closed position, tips of the third claw and the second claw come into contact with the first shaft, rotation of the second member stops.

19. The coin handling apparatus of claim 1, wherein as viewed from above, the first member has a T-shape and the second member has a U-shape.

* * * * *